United States Patent
Wu et al.

(10) Patent No.: US 11,784,715 B2
(45) Date of Patent: Oct. 10, 2023

(54) OPTICAL COMMUNICATION SYSTEM CAPABLE OF ENSURING OPERATION SAFETY OF EXTERNAL LASER SOURCE

(71) Applicant: Prime World International Holdings Ltd., New Taipei (TW)

(72) Inventors: Chien-Wei Wu, New Taipei (TW); Dong-Yi Lu, New Taipei (TW); Hsin-Wen Lin, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 17/590,297

(22) Filed: Feb. 1, 2022

(65) Prior Publication Data
US 2023/0246713 A1    Aug. 3, 2023

(51) Int. Cl.
*H04B 10/50* (2013.01)
*H04B 10/2581* (2013.01)
*H04B 10/80* (2013.01)

(52) U.S. Cl.
CPC ..... *H04B 10/2581* (2013.01); *H04B 10/5057* (2013.01); *H04B 10/801* (2013.01); *H04B 10/808* (2013.01); *H04B 2210/08* (2013.01)

(58) Field of Classification Search
None
See application file for complete search history.

(56) References Cited

U.S. PATENT DOCUMENTS

| | | | | |
|---|---|---|---|---|
| 6,836,493 B2 * | 12/2004 | Mahowald | ............. | H04B 10/40 372/38.01 |
| 6,897,424 B2 * | 5/2005 | Suzuki | ................. | H04B 10/671 398/15 |
| 6,952,531 B2 * | 10/2005 | Aronson | ................ | H04B 10/40 398/137 |
| 7,342,949 B2 * | 3/2008 | Suda | ................... | H04N 1/40037 347/246 |
| 7,349,454 B2 * | 3/2008 | Quek | ................... | H01S 5/06832 372/38.07 |

(Continued)

FOREIGN PATENT DOCUMENTS

WO    WO-9712454 A1 *   4/1997   ........... H04B 10/077

OTHER PUBLICATIONS

Laser Safety Fact, 2014 (Year: 2014).*

*Primary Examiner* — Jai M Lee
(74) *Attorney, Agent, or Firm* — Grossman Tucker Perreault & Pfleger, PLLC

(57) ABSTRACT

An optical communication system includes an optical module and a host. The optical module has a fiber connector and a laser condition pin, wherein the fiber connector is configured to connect to a laser output of an external laser source. The optical module is configured to set an output of the laser condition pin to have a first value when detecting a laser beam through the fiber connector. The host is connected to the laser condition pin and has a control connector, wherein the control connector is configured to connect to the external laser source. The host is configured to output a release signal through the control connector when detecting the first value on the laser condition pin, wherein the release signal changes the laser output from outputting a laser beam having a first power to outputting a laser beam having a second power higher than the first power.

19 Claims, 3 Drawing Sheets

(56) References Cited

U.S. PATENT DOCUMENTS

| | | | | |
|---|---|---|---|---|
| 7,515,619 B2* | 4/2009 | Juluri | H01S 5/0683 | |
| | | | 372/38.07 | |
| 7,562,826 B2* | 7/2009 | Schneider | G06K 7/10851 | |
| | | | 235/462.25 | |
| 7,580,638 B2* | 8/2009 | Aronson | H04B 10/801 | |
| | | | 398/136 | |
| 7,646,990 B2* | 1/2010 | Weber | H04Q 11/0067 | |
| | | | 398/71 | |
| 7,663,480 B2* | 2/2010 | Santoro | H04B 10/0773 | |
| | | | 340/3.1 | |
| 7,742,514 B1* | 6/2010 | Sanders | H01S 5/042 | |
| | | | 372/38.07 | |
| 8,194,517 B2* | 6/2012 | Okada | G11B 7/1275 | |
| | | | 369/53.26 | |
| 9,577,759 B2* | 2/2017 | Aronson | H04B 10/40 | |
| 9,653,878 B2* | 5/2017 | Jia | H04B 10/503 | |
| 9,673,893 B2* | 6/2017 | Decker | H04B 10/03 | |
| 9,985,407 B2* | 5/2018 | Matsuoka | G01J 1/44 | |
| 10,291,324 B2* | 5/2019 | Aronson | G01M 11/00 | |
| 10,320,487 B2* | 6/2019 | Giessler | H04B 10/524 | |
| 10,935,742 B2* | 3/2021 | Maniloff | G02B 6/4296 | |
| 11,549,651 B2* | 1/2023 | Krijn | H01S 5/0078 | |
| 2003/0095303 A1* | 5/2003 | Cunningham | H04B 10/40 | |
| | | | 398/140 | |
| 2022/0115832 A1* | 4/2022 | Lin | H01S 5/0683 | |

* cited by examiner

OPTICAL COMMUNICATION SYSTEM CAPABLE OF ENSURING OPERATION SAFETY OF EXTERNAL LASER SOURCE

BACKGROUND

1. Technical Field

This disclosure relates to an optical communication system, and more particularly, to an optical communication system capable of ensuring operation safety of an external laser source.

2. Related Art

Co-packaged optics (CPO) is a rising technology that addresses some of the challenges facing small form factor pluggable optical transceivers, including thermal management, power consumption, bandwidth, and port density. The objective is to move the electro-optic conversion process as close as possible to the switch, and/or the application specific integrated circuit (ASIC) die to achieve higher bandwidth and energy efficiency. The active device and optical transceivers are mounted on the same substrate, eliminating all loss and distortion attributed to the copper trace on the motherboard.

Some CPO designs rely on an external laser source (ELS) to provide a continuous-wave (CW) light source to the optical modules. The ELS is pluggable for easy replacement. However, in the conventional art neither the CPO nor even the host (which could be a switch IC) could recognize if the ELS is removed from the CPO for replacement or if the connection between the CPO and the ELS compromises. Therefore, the high-power laser beam emitted by the ELS may damage the user's eyes when the connection (e.g., optical fiber) between the CPO and the ELS is removed or damaged. In addition, if the CPO and the ELS are not well connected to each other, the dust near the connection may be burnt and adhere to the connection as the two devices under the high power mode, which causes the laser power received by the CPO to be less than expected. Furthermore, if the CPO and the ELS are not well connected to each other, the fiber end face may be damaged due to the high power of the ELS.

SUMMARY

Accordingly, this disclosure provides an optical communication system capable of ensuring operation safety of an external laser source.

According to one or more embodiment of this disclosure, an optical communication system includes an optical module and a host. The optical module has a fiber connector and a laser condition pin, with the fiber connector configured to connect to a laser output of an external laser source. The optical module is configured to set an output of the laser condition pin to have a first value when detecting a laser beam through the fiber connector. The host is connected to the laser condition pin and has a control connector configured to connect to the external laser source. The host is configured to output a release signal through the control connector when detecting the first value on the laser condition pin. The release signal changes the external laser source from outputting a laser beam having a first power through the laser output to outputting a laser beam having a second power higher than the first power through the laser output.

In view of the above description, the optical communication system may cause the external laser source to have a small laser power when not detecting the light source provided by the external laser source. It may prevent the user's eyes from being damaged by the high-power laser beam when the connection between the optical communication system and the external laser source is damaged or removed. Besides, it may prevent the dust near the connection from being burnt and prevent the fiber end face from being damaged if the optical communication system and the external laser source are not well connected to each other. Moreover, it may reduce the power consumption of the external laser source automatically as the external laser source is not connected to the optical communication system.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
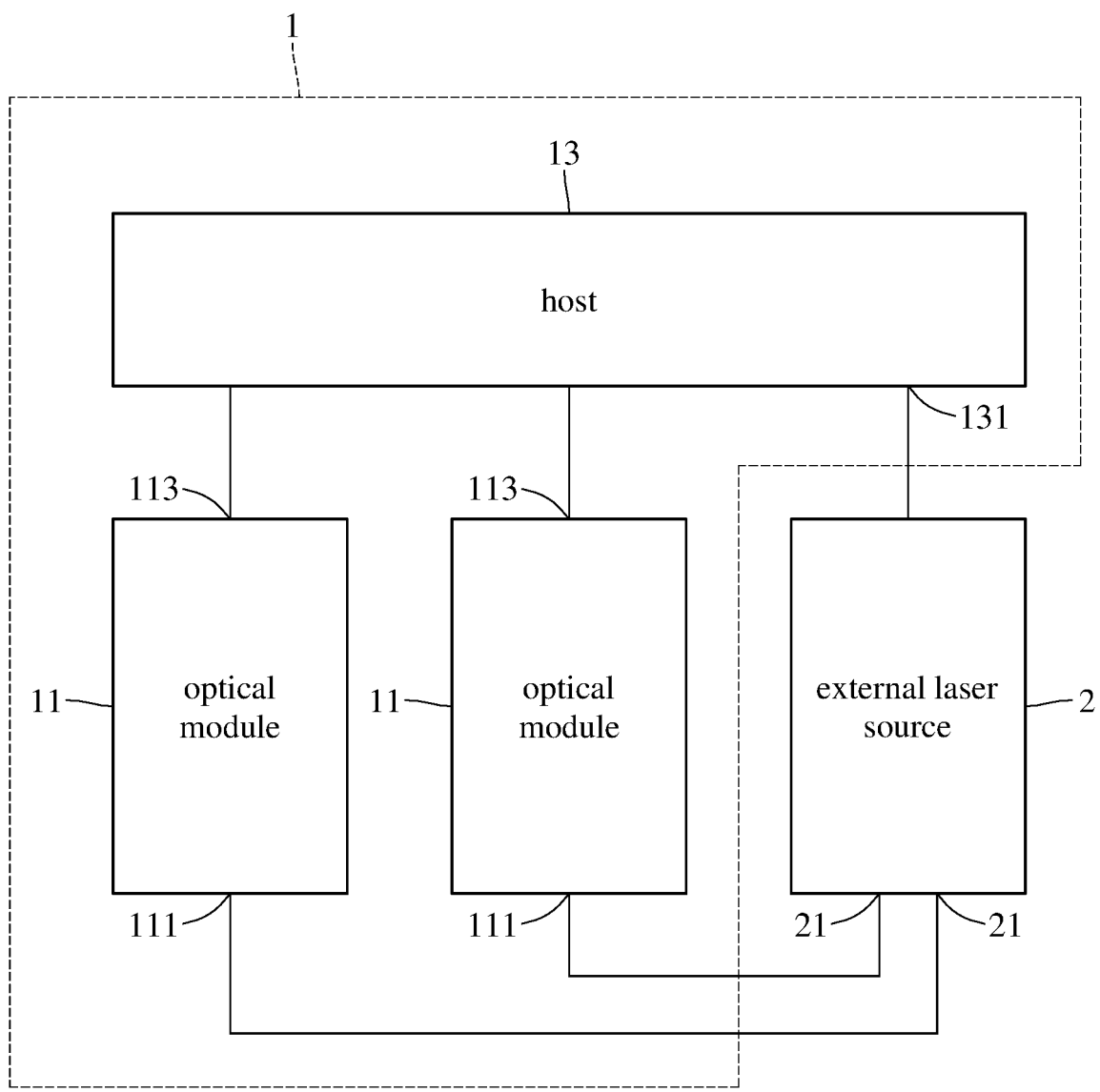
FIG. 1 is a function block diagram of an optical communication system and an external laser source according to an embodiment of this disclosure.

Please refer to FIG. 1 which is a function block diagram of an optical communication system and an external laser source according to an embodiment of this disclosure. As shown in FIG. 1, an optical communication system 1 may include two optical modules 11 and a host 13. Each of the optical modules 11 has a fiber connector 111 and a laser condition pin 113. The fiber connector 111 is configured to connect to a laser output 21 of an external laser source 2. More particularly, the fiber connector 111 of the optical module 11 may be connected to the laser output 21 of the external laser source 2 through an optical fiber. The host 13 is connected to the laser condition pin 113 of each of the optical modules 11 and has a control connector 131 that is configured to connect to the external laser source 2. More particularly, the host 13 may be connected to the external laser source 2 through an inter-integrated circuit ($I^2C$). Besides the laser condition pin 113, the connections between the host 13 and the optical modules 11 may also include optical connections (not shown).

Each optical module 11 may be implemented in terms of co-packaged optics (CPO). The optical module 11 may include a digital signal processor (DSP), a modulator driver and trans-impedance amplifier (TIA) chips, an optical transmitter and an optical receiver. Alternatively, the optical module 11 may be 400GBASE-FR4 module or 400GBASE-DR4 module including an optical multiplexer (MUX) and a de-multiplexer (DEMUX). The optical modules 11 included in the optical communication system 1 might not be of the same type in this disclosure. The optical modules 11 may have the same optical specification or different optical specifications. The host 13 may be a switch integrated circuit (IC), for example, a switch application specific integrated circuit (ASIC). The external laser source 2 may be a pluggable laser source. In other words, if the external laser source 2 is damaged it may be easily replaced by another external laser source. The external laser source 2 may include multiple laser components controlled individually to provide laser beams through the two laser outputs 21 to the two optical modules 11 respectively.

It should be noted that although FIG. 1 illustrates that the optical communication system 1 includes two optical modules 11, one optical module or more than two optical modules could be present in other embodiments of the disclosure. It is also worth noting that each external laser source might pair with two optical modules. For example, the optical communication system including 16 optical modules may be equipped with 8 external laser sources. Moreover, although FIG. 1 illustrates that the external laser source 2 is not included in the optical communication system 1, the external laser source may be regarded as a component of the optical communication system in another embodiment.

In general operation under the high power modes of the optical module(s) 11 of the optical communication system 1 and the external laser source 2, the external laser source 2 may be driven by the host 13 through the I²C to provide a continuous wave light source to the optical module(s) 11 through the corresponding optical fiber(s). And the optical module(s) 11 provides optical I/O to the host 13 through the optical connections. More particularly, the power mode of a module (i.e., optical module, external laser source in this disclosure) is either at high power or low power. The maximum module power consumption under the low power mode is defined in the relevant hardware specification. The maximum module power consumption under the high power mode is module implementation dependent. The purpose of the low power mode is to ensure that a plugged-in module can be recognized by the host, which could also go ahead to reject the module when certain conditions such as the operational power consumption would exceed the host's capabilities are met.

Besides the general operation, the optical module(s) 11 and the host 13 of the optical communication system 1 are configured to perform a laser safety control procedure on the external laser source 2. In the laser safety control procedure, each of the optical modules 11 may set the output of the laser condition pin 113 to have a first value when detecting a laser beam through the fiber connector 111, and the host 13 may output a release signal through the control connector 131 when detecting the first value on the laser condition pin 113. The release signal may change the external laser source 2 from outputting a laser beam having a first power through the laser output 21 to outputting a laser beam having a second power higher than the first power through the laser output 21. In this embodiment and the following embodiments, the first power may be set as the power less than 1 mW, and the second power may be set as the maximum power of the external laser source 2.

For each of the optical modules 11, before transitioning into the high power mode from the low power mode the optical module 11 may periodically or continuously determine whether a laser beam is detected through the fiber connector 111. And the output of the laser condition pin 113 might remain at a second value until the laser beam is detected. When the optical module 11 detects the laser beam, the optical module 11 may set the output of the laser condition pin 113 to the first value and switch into the high power mode. In this embodiment and the following embodiments, both the first value and the second value may be in terms of a binary format (0 or 1) and opposite to each other. For example, when the first value is 0, the second value may be 1. The laser components of the external laser source 2 may output the laser beam having the first power through the laser output 21 under the low power mode, and output the laser beam having the second power through the laser output 21 under the high power mode. The release signal may cause a part of the laser components of the external laser source 2 to switch from the low power mode into the high power mode. Accordingly, the laser beam having the second power could be provided by the optical module 11.

With the above-mentioned laser safety control procedure, when the optical communication system 1 and the external laser source 2 boot up, for each of the optical modules 11 (which could be the target optical module from the viewpoint of the external laser source 2), the external laser source 2 may output the laser beam with a small power to the target optical module until receiving the release signal corresponding to the target optical module from the host 13 through the I²C. If any connection between the optical communication assembly 1 and the external laser source 2 (e.g., the optical fiber) is damaged or removed, the optical communication assembly 1 may not detect the laser beam and accordingly the power of the laser beam outputted by the external laser source 2 may be reduced to its corresponding small power level.

In addition to performing the laser safety control procedure when the optical modules 11 and the external laser source 2 are under the low power modes, the optical modules 11 and the host 13 of the optical communication system 1 are further configured to perform another laser safety control procedure when the optical modules 11 and the external laser source 2 are under the high power modes. More particularly, each of the optical modules 11 may periodically or continuously determine whether the laser beam is detected through the fiber connector 111 when the optical module 11 is under the high power mode, and when the optical module 11 cannot detect the laser beam through the fiber connector 111, the optical module 11 may set the output of the laser condition pin 113 to have the second value allowing for the low power mode to be entered. The host 13 may output an interruption signal through the control connector 131 when detecting the second value on the laser condition pin 113 and determining that the laser output 21 outputs the laser beam having the second power (i.e., under the high power mode). The interruption signal may be used to change the external laser source 2 from outputting the laser beam having the second power through the laser output 21 to outputting the laser beam having the first power through the laser output 21. In other words, the interruption signal may instruct a part of the laser components of the external laser source 2 to switch from the high power mode into the low power mode to provide the laser beam having the first power to the optical module 11 in connection with the interruption signal. With this laser safety control procedure, the optical communication system 1 may cause the external laser source 2 to have a small laser power immediately if the optical module 11 cannot detect the laser beam given by the external laser source 2 under the high power mode.

In an embodiment, regardless of the optical modules 11 and the external laser source 2 operating in the low power mode or the high power mode, the host 13 may output a control signal containing the detection results of the outputs of the laser condition pins 113 of the optical modules 11 to the external laser source 2. More particularly, each of the optical modules 11 may periodically or continuously determine if the laser beam detected through the laser condition pin 113 indicative of the same being in the high power mode or the low power mode. The optical module 11 sets the output of its laser condition pin 113 to the second value if the optical module 11 cannot detect the laser beam through the fiber connector 111, and sets the output of its laser condition pin 113 to the first value if the optical module 11 detects the laser beam through the fiber connector 111. The host 13 detects the outputs of the laser condition pins 113 of the optical modules 11 and accordingly sends the control signal to the external laser source 2. The control signal has two bits that correspond to the detection results of the optical modules 11 respectively.

If the outputs of the laser condition pins 113 of the optical modules 11 are both set to the first value, the two bits of the control signal are both set as a preset enabling value (e.g., 1) to control the external laser source 2 to output laser beams with the second power to both of the optical modules 11. On the other hand, if the outputs of the laser condition pins 113 of the optical modules 11 are both set to the second value, the two bits of the control signal are both set as a preset disabling value (e.g., 0) to control the external laser source 2 to output laser beams with the first power. Also, if one of the outputs of the laser condition pins 113 of the optical modules is set to the second value and the other is set to the first value, the bit in the control signal corresponds to the optical module 11 not detecting the laser beam is set as the preset disabling value and the other bit is set as the preset enabling value. In one embodiment, the release signal may be implemented by a bit with the preset enabling value, and the interruption signal may be implemented by a bit with the preset disabling value.

For example, the above-mentioned control logic of the external laser source 2 may be regarded as follows:

$$ELScomponent \begin{cases} LaserRxLOS = 1, \text{Output less than 1 mW light source} \\ LaerRxLOS = 0, \text{Output maximum power light source} \end{cases}$$

wherein LaserRxLOS represents the output of the laser condition pin 113.

Figure 2:
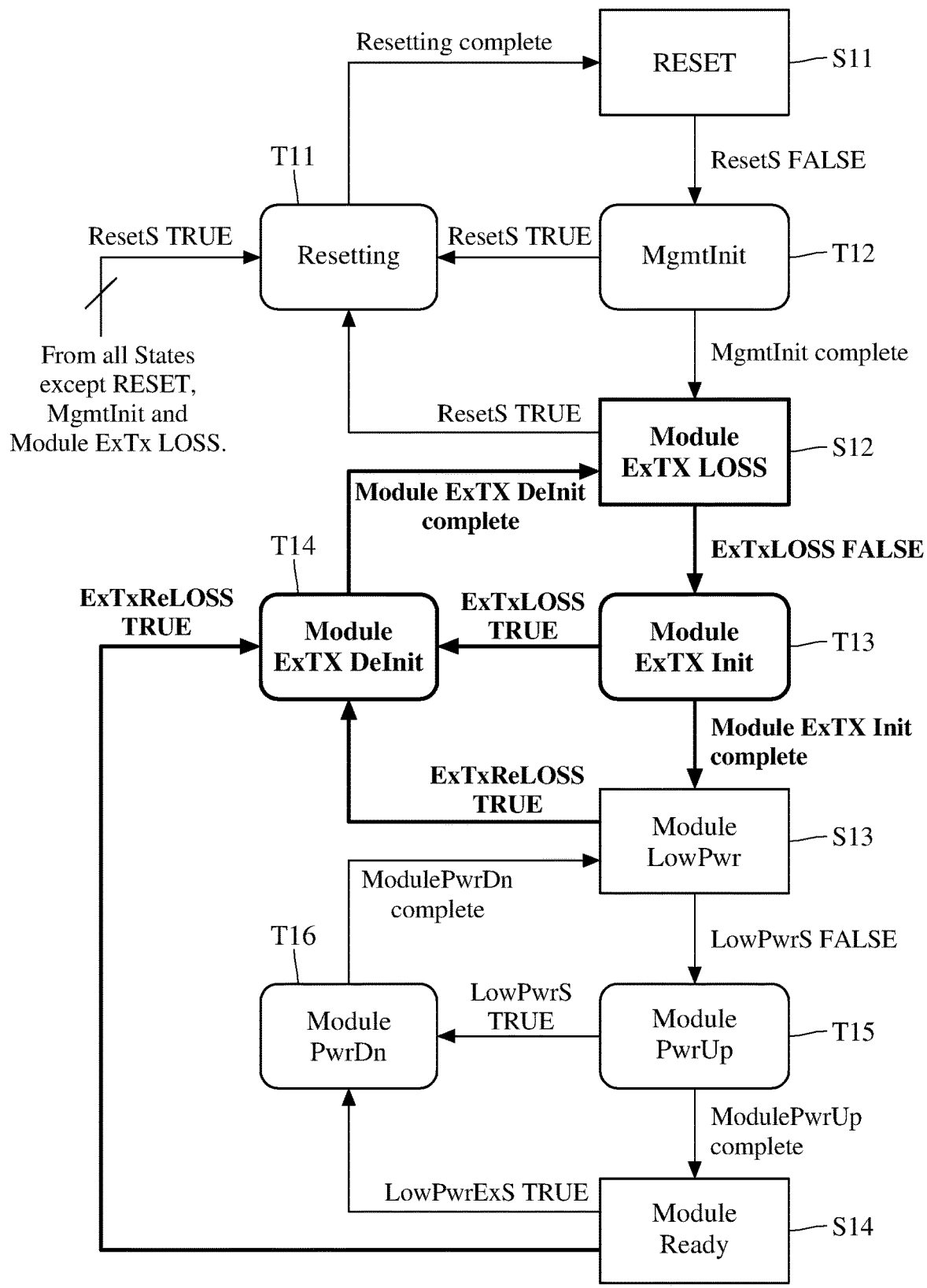
FIG. 2 is a function block diagram of a module state machine of an optical module according to an embodiment of this disclosure.
Figure 3:
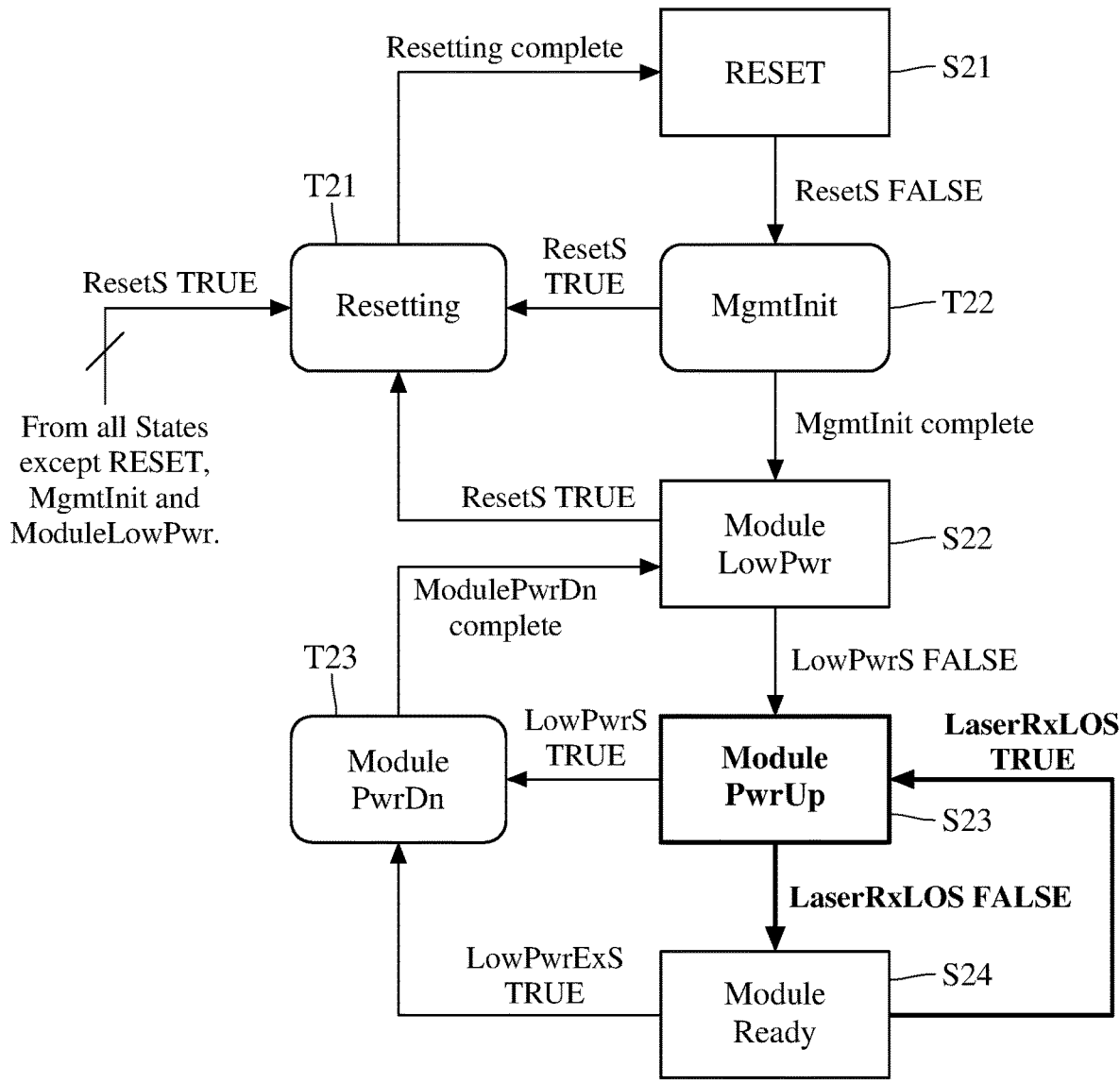
FIG. 3 is a function block diagram of a module state machine of an external laser source according to an embodiment of this disclosure.

In some embodiments, the above-mentioned laser safety control procedures may involve the design of module state machines of the optical module 11 and the external laser source 2. Please refer to FIGS. 1-3. FIG. 2 is a function block diagram of a module state machine of an optical module according to an embodiment of this disclosure, and FIG. 3 is a function block diagram of a module state machine of an external laser source according to an embodiment of this disclosure. The module state machines shown in FIG. 2 and FIG. 3 are created based on Paged Memory Module State Machine.

As shown in FIG. 2, besides transient states Resetting T11, MgmInit T12, ModulePwrUp T15 and ModulePwrDn T16 and steady states RESET S11, ModuleLowPwr S13 and ModuleReady S14, the module state machine of the optical module 11 may further include a steady laser detection state Module ExTX LOSS S12 and accompanying transient states Module ExTX Init T13 and Module ExTX DeInit T14.

The laser detection indicated by the laser detection state Module ExTX LOSS S12 may perform before the ready state ModuleReady S14 is entered. The states T11, T12, T15, T16, S11, and S13 and their exit conditions remain unchanged as provided in the traditional art. The laser detection state Module ExTX LOSS S12 on the other hand is newly introduced. In the laser detection state Module ExTX LOSS S12, the optical module 11 may periodically or continuously determine whether the laser beam is detected through the fiber connector 111. During this state, the laser condition pin 113 may stay as high, and the software flag may keep asserting. The exit condition ExTxLOSS FALSE of the laser detection state Module ExTX LOSS S12 may indicate the optical module 11 detect the laser beam. In the transient state Module ExTX Init T13, the optical module 11 may initialize its optical components and set the Tx output power as required of the steady state ModuleLowPwr S13. In addition, the laser condition pin 113 may be set as low, and the software flag may be de-asserted during this state. After the optical module 11 completes the work in Module ExTX Init T13, the optical module 11 may leave Module ExTX Init T13 and go through ModuleLowPwr S13.

If ExTxLOSS becomes TRUE or ExTxReLOSS becomes TRUE, the optical module 11 may switch into the transient state Module ExTX DeInit T14. ExTxLOSS is a transition signal, and may react while the optical module 11 has not passed through Module ExTX Init state T13. ExTxLOSS is FALSE while the optical module 11 detects the laser beam; otherwise, ExTxLOSS is TRUE. ExTxReLOSS may act after the optical module 11 has passed through Module ExTX Init state T13. From all states except RESET S11, MgmtInit T12 and Resetting T11, ExTxReLOSS may be set as TRUE when the optical module 11 cannot detect the laser beam. ExTxReLOSS may be set as FALSE when the optical module 11 can detect the laser beam. In Module ExTX DeInit T14, the optical module 11 may shut down all the traffic and set the module power required by ModuleLowPwr S13. The laser condition pin 113 may change to high, and also, the software flag may be asserted to notice the host 13 that no laser beam is detected. After the optical module 11 completes the work in Module ExTX DeInit T14, the optical module 11 may leave Module ExTX DeInit T14 and go through Module ExTX LOSS 512.

In general, the module switches from the low power mode into the high power mode in ModulePwrUp T15. Therefore, the laser detection state may be regarded as one implementation of the above-mentioned laser safety control procedure before the optical module 11 switches from the low power mode into the high power mode.

In the ready state ModuleReady S14, the optical module 11 may also periodically or continuously determine whether the laser beam is detected through the fiber connector 111. The exit condition ExTxReLOSS TRUE of the ready state ModuleReady S14 may indicate the optical module 11 does not detect the laser beam. ModuleReady S14 may be followed by Module ExTX DeInit T14, which might be followed by Module ExTX LOSS S12 in the same state machine flow. In short, the optical module 11 may switch from the ready state (ModuleReady S14) into the laser detection state (Module ExTX LOSS S12) when not detecting the laser beam. The laser detection performed in ModuleReady S14 may be regarded as one implementation of the above-mentioned laser safety control procedure performed under the high power mode.

In FIG. 3, states T21, T22, T23, S21, S22 and S24 and their exit conditions remain the same as those in the conventional art. In comparison with the conventional art, the powerup state ModulePwrUp S23 before the ready state ModuleReady S24 in the module state machine of the external laser source 2 may be newly introduced in the present disclosure as another steady state. In the steady power-up state ModulePwrUp S23, the external laser source 2 may output the laser beam having the first power. In the ready state ModuleReady S24, the external laser source 2 may output the laser beam having the second power. As shown in FIG. 23, the condition for switching from ModulePwrUp S23 to ModuleReady S24 is LaserRxLOS FALSE, which indicates the release signal from the host 13. More specifically, the external laser source 2 switches from the steady power-up state into the ready state upon the receipt of the release signal.

Moreover, the module state machine of the external laser source 2 may further include the condition LaserRxLOS TRUE for switching from ModuleReady S24 into ModulePwrUp S23. Condition LaserRxLOS TRUE might correspond to the interruption signal from the host 13. As such, the external laser source 2 switches from the ready state into the steady power-up state upon the receipt of the interruption signal.

In view of the above description, the optical communication system may force the external laser source to have a small laser power when not detecting the light source given by the external laser source. It may prevent the user's eyes from being damaged by the high-power laser beam despite the connection between the optical communication system and the external laser source has been compromised. Besides, it may prevent the dust near the connection from being burnt and therefore adhered to the connection and/or prevent the fiber end face from being damaged if the optical communication system and the external laser source are not well connected to each other. Moreover, it may reduce the power consumption of the external laser source automatically as the external laser source is not connected to the optical communication system.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical communication system, comprising:
an optical module having a fiber connector and a laser condition pin, wherein the fiber connector is configured to connect to a laser output of an external laser source, and the optical module is configured to set an output of the laser condition pin to have a first value when detecting a laser beam through the fiber connector; and
a host connected to the laser condition pin and having a control connector, wherein the control connector is configured to connect to the external laser source, the host is configured to output a release signal through the control connector when detecting the first value on the laser condition pin, and the release signal changes the external laser source from outputting a laser beam having a first power through the laser output to outputting a laser beam having a second power higher than the first power through the laser output; and
wherein a module state machine of the optical module comprises a laser detection state before a low power state, wherein the laser detection state is entered before a low power mode, the optical module periodically or continuously determines whether the laser beam is detected through the fiber connector in the laser detection state, and exits the laser detection state when detecting the laser beam.

2. The optical communication system according to claim 1, wherein the optical module is further configured to set the output of the laser condition pin to have a second value when not detecting the laser beam through the fiber connector, the host is further configured to output an interruption signal through the control connector when detecting the second value on the laser condition pin and determining that the laser output outputs the laser beam having the second power, and the interruption signal instructs the external laser source to output the laser beam having the first power through the laser output.

3. The optical communication system according to claim 2, wherein a module state machine of the external laser source comprises a steady power-up state and a ready state, the external laser source outputs the laser beam having the first power in the steady power-up state and outputs the laser beam having the second power in the ready state, and the external laser source switches from the ready state into the steady power-up state when receiving the interruption signal.

4. The optical communication system according to claim 1, wherein before the optical module switches into a high power mode from a low power mode, the optical module is further configured to periodically or continuously determine whether the laser beam is detected through the fiber connector until the laser beam is detected.

5. The optical communication system according to claim 1, wherein the optical module is further configured to periodically or continuously determine whether the laser beam is detected through the fiber connector when the optical module is in a high power mode, and switches into a low power mode when not detecting the laser beam.

6. The optical communication system according to claim 1, wherein the optical module switches from the ready state into the laser detection state when not detecting the laser beam.

7. The optical communication system according to claim 1, wherein a module state machine of the external laser source comprises a steady power-up state and a ready state, the external laser source outputs the laser beam having the first power in the steady power-up state and outputs the laser beam having the second power in the ready state, and the external laser source switches from the steady power-up state into the ready state when receiving the release signal.

8. The optical communication system according to claim 1, further comprising:
a second optical module having a second fiber connector and a second laser condition pin, wherein the second fiber connector is configured to connected to a second laser output of the external laser source, the second laser condition pin is connected to the host, and the second optical module is configured to set an output of the second laser condition pin to have the first value when detecting a laser beam through the second fiber connector;
wherein the host is further configured to output a second release signal through the control connector when detecting the first value on the second laser condition pin, and the second release signal changes the second laser output from outputting a laser beam having the first power to outputting a laser beam having the second power.

9. The optical communication system according to claim 1, wherein the first power is less than 1 mW.

10. An optical communication system, comprising:
an optical module having a fiber connector and a laser condition pin, wherein the fiber connector is configured to connect to a laser output of an external laser source, and the optical module is configured to set an output of the laser condition pin to have a first value when detecting a laser beam through the fiber connector; and
a host connected to the laser condition pin and having a control connector, wherein the control connector is configured to connect to the external laser source, the host is configured to output a release signal through the control connector when detecting the first value on the laser condition pin, and the release signal changes the external laser source from outputting a laser beam having a first power through the laser output to outputting a laser beam having a second power higher than the first power through the laser output;
wherein the external laser source comprises a module state machine of the external laser source, the module state machine of the external laser source comprises a steady power-up state and a ready state, the external laser source outputs the laser beam having the first power in the steady power-up state and outputs the laser beam having the second power in the ready state, and the external laser source switches from the steady power-up state when receiving the release signal.

11. The optical communication system according to claim 10, wherein the optical module is further configured to set the output of the laser condition pin to have a second value when not detecting the laser beam through the fiber connector, the host is further configured to output an interruption signal through the control connector when detecting the second value on the laser condition pin and determining that the laser output outputs the laser beam having the second power, and the interruption signal instructs the external laser source to output the laser beam having the first power through the laser output.

12. The optical communication system according to claim 11, wherein the external laser source switches from the ready state into the steady power-up state when receiving the interruption signal.

13. The optical communication system according to claim 10, wherein before the optical module switches into a high power mode from a low power mode, the optical module is further configured to periodically or continuously determine whether the laser beam is detected through the fiber connector until the laser beam is detected.

14. The optical communication system according to claim 10, wherein the optical module is configured to switch into a low power mode from a high power mode.

15. The optical communication system according to claim 14, wherein the optical module is further configured to periodically or continuously determine whether the laser beam is detected through the fiber connector when the optical module is in a high power mode, and switches into a low power mode when not detecting the laser beam.

16. The optical communication system according to claim 10, further comprising:
a second optical module having a second fiber connector and a second laser condition pin, wherein the second fiber connector is configured to connected to a second laser output of the external laser source, the second laser condition pin is connected to the host, and the second optical module is configured to set an output of the second laser condition pin to have the first value when detecting a laser beam through the second fiber connector;
wherein the host is further configured to output a second release signal through the control connector when detecting the first value on the second laser condition pin, and the second release signal changes the second laser output from outputting a laser beam having the first power to outputting a laser beam having the second power.

17. The optical communication system according to claim 10, wherein a module state machine of the optical module is configured to switch into a low power state from a module power up state.

18. The optical communication system according to claim 10, wherein the module state machine of the external laser source is configured to transition from the ready state to the low power state.

19. The optical communication system according to claim 10, wherein the module state machine of the external laser source is configured to transition from the power-up state to the low power state.

* * * * *